United States Patent [19]

Belanger et al.

[11] Patent Number: 4,700,058

[45] Date of Patent: Oct. 13, 1987

[54] FILM WRITING SYSTEM WITH CLOSED LOOP CONTROL FOR ELECTRONIC IMAGES

[75] Inventors: Barry F. Belanger, Milwaukee; Thomas P. L. Liu, New Berlin; Thomas W. Lambert, Dousman, all of Wis.

[73] Assignee: General Electric Company, Milwaukee, Wis.

[21] Appl. No.: 761,439

[22] Filed: Aug. 1, 1985

[51] Int. Cl.⁴ .................... H04N 5/32; G01D 18/00
[52] U.S. Cl. .................................. 250/205; 378/99; 378/207
[58] Field of Search ............... 250/205, 578; 354/20, 354/298; 355/68, 69; 356/443, 444; 358/111; 378/99, 156–159, 207

[56] References Cited

U.S. PATENT DOCUMENTS 3,400,632  9/1968  Wahli ................................ 355/68
4,172,659 10/1979  Laska ............................... 355/68

Primary Examiner—Edward P. Westin
Attorney, Agent, or Firm—Douglas E. Stoner; James H. Beusse

[57] ABSTRACT

An imaging system for generating a image on film from video image data incorporates feedback control techniques to provide control of film density. The system includes variable gain amplifiers responsive to light intensity output of a film writing device for maintaining the output at a desired set level. In addition, the system includes apparatus and a method for monitoring the density of film images produced by the system and for utilizing the monitored values to modify the system transfer function in a direction to effect a change in the film density towards a desired value.

21 Claims, 6 Drawing Figures

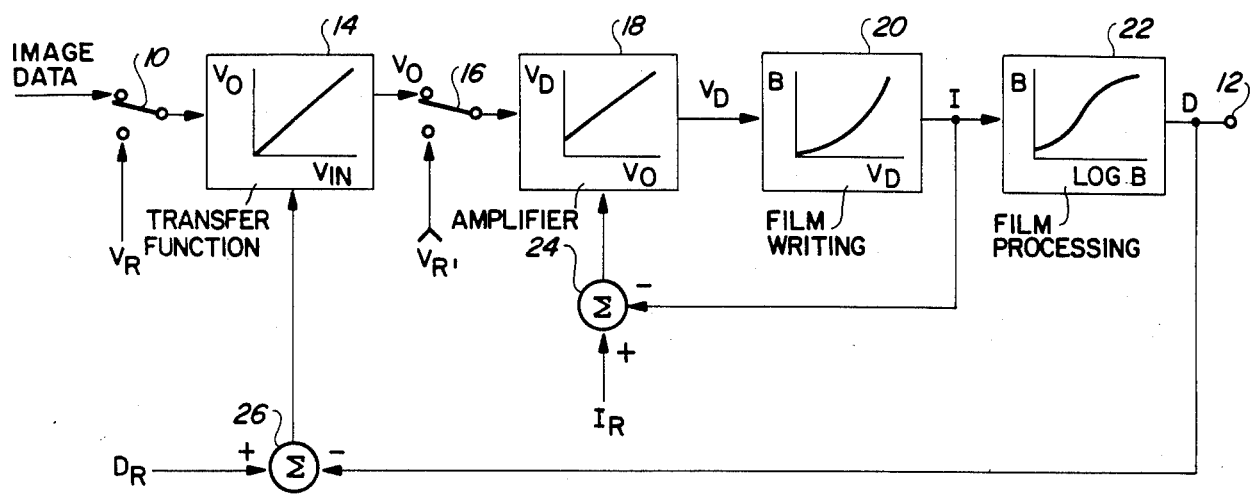
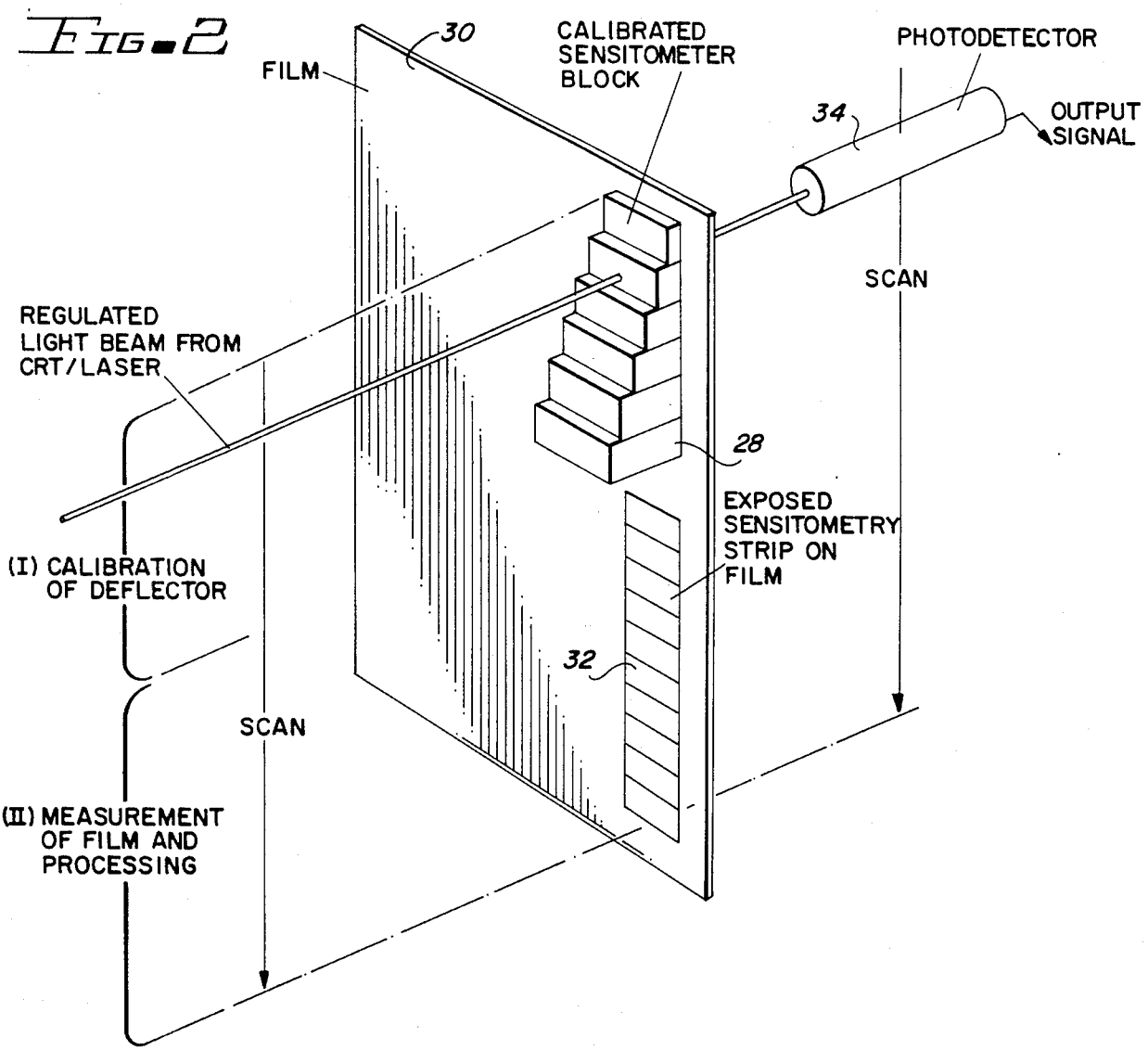

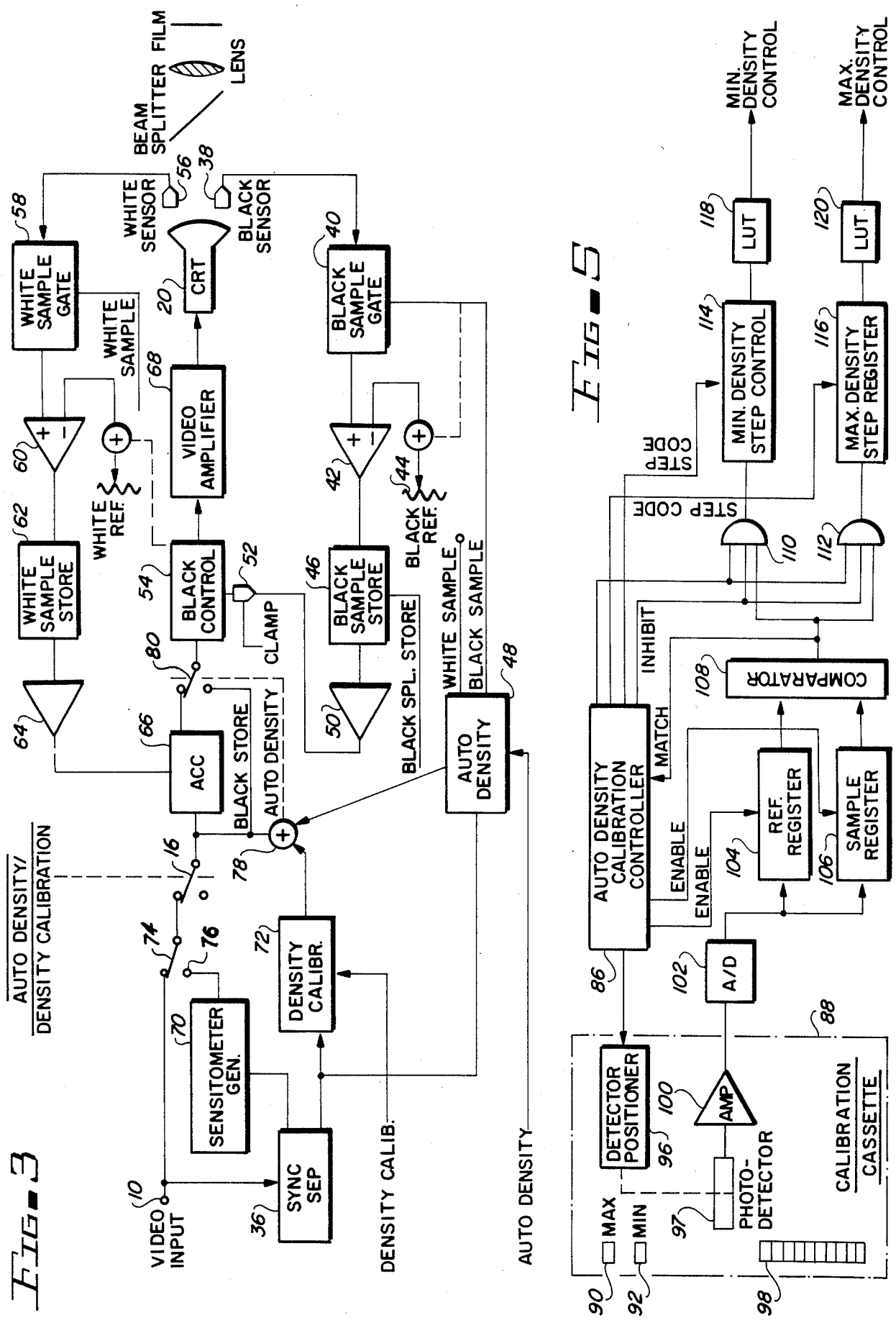

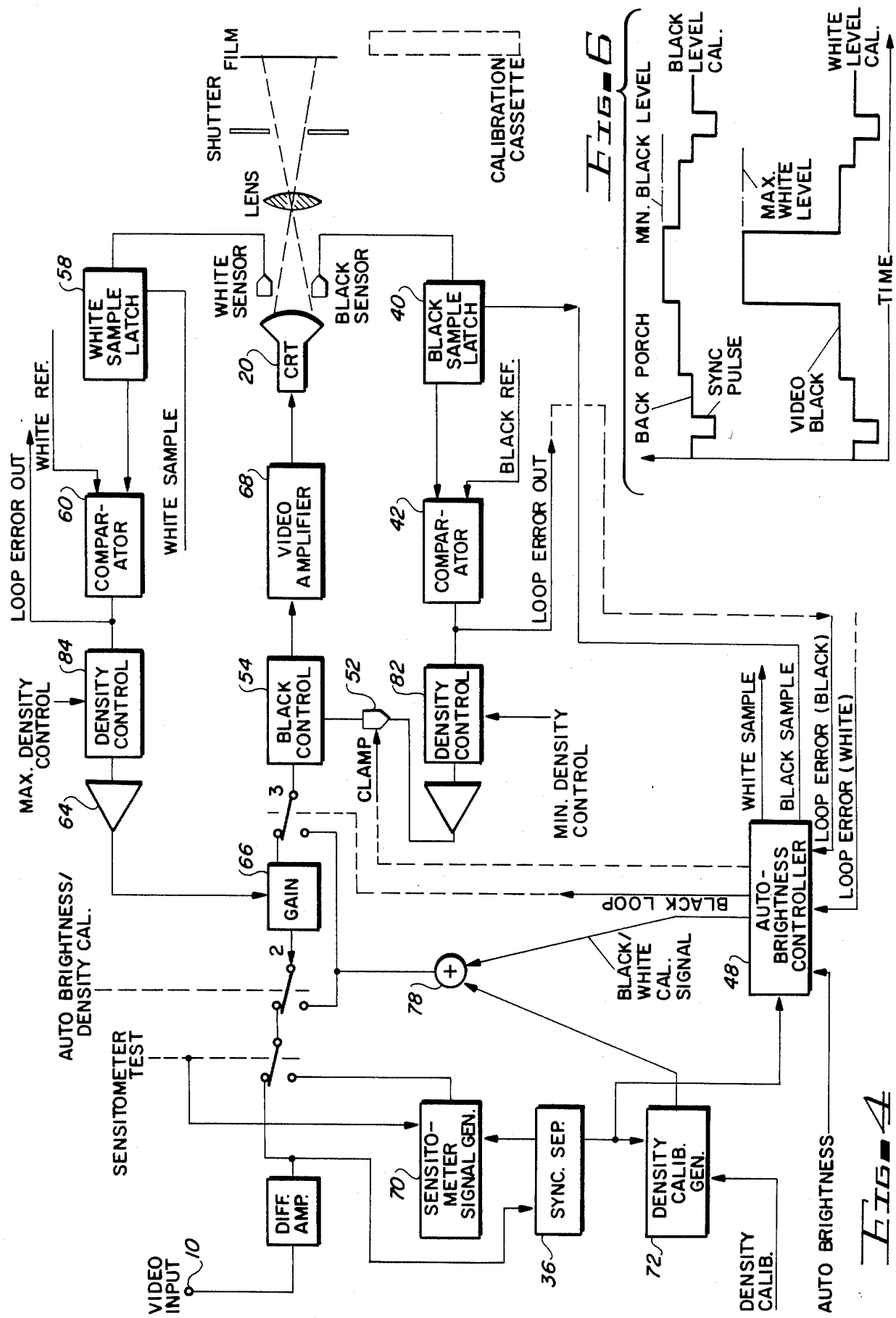

FILM WRITING SYSTEM WITH CLOSED LOOP CONTROL FOR ELECTRONIC IMAGES

BACKGROUND OF THE INVENTION

The present invention relates to medical x-ray systems and, more particularly, to a system for producing uniform x-ray film images from electronic images.

Currently available film writing systems are subject to variations in their light output which give rise to variations in film density. Such film density variations may effect the ability to accurately diagnose medical problems using x-ray film analysis. The problems of film density variation are also aggravated by variations in the film itself and in the film processing. Since film processing involves a chemical treatment and reaction, the chemicals become contaminated with repeated use resulting in film density variations as a function of time and use.

Compensation for film density variations in the currently available processing systems have relied on trial and error techniques. Typically, a known reference image signal is provided to the system and a film exposed and developed. An operator then evaluates the image density on the film and adjusts the gain of the system in a direction to compensate for any deviations in film density from a desired norm. This process is repeated until a satisfactory film density is attained. Unfortunately, instabilities in the control system for the light source and changes in the film processing result in early deterioration of film quality thus requiring a repeated alignment procedure by trial and error adjustment.

It is an object of the present invention to provide an improved system for converting electronic images to film images.

It is another object of the present invention to provide an improved system for converting electronic images to film images which automatically compensates for variations in light output.

It is a further object of the present invention to provide an improved system for converting electronic images to film images which includes compensation for variations in film density.

DESCRIPTION OF THE DRAWINGS

For a better understanding of the present invention, reference may be had to the following detailed description taken in conjunction with the accompanying drawing in which:

FIG. 1 is a simplified functional block diagram of a control system in accordance with the present invention;

FIG. 2 is a simplified diagram of a film density metering system; and

FIG. 3 is a functional block diagram of a feedback control system for controlling write intensity output in accordance with the present invention.

FIG. 4 is a functional block diagram of an alternate embodiment of the system of FIG. 3 in which the density control function is incorporated in the write intensity feedback control loop;

FIG. 5 is a block diagram of an automatic density control apparatus including an alternate form of calibration film holder cassette for use with the embodiment of FIG. 4; and FIG. 6 is an illustration of minimum and maximum video intensity calibration signals.

SUMMARY

In accordance with one embodiment of the present invention an electronic film writing system and a film processing system are combined into a control system including a first control loop to regulate light output of the film writing device and a second control loop to compensate for variations in developed film density. In the film writing system a light source such as a cathode ray tube (CRT) or laser provides a light output which can be used to impress an image on a film. The light soruce is driven by a variable gain, adjustable offset amplifier at a level to produce sufficient light to properly expose a film. In order to maintain the light output at a constant regulated level, a light sensor is connected in a light path adjacent the light source and provides a control signal representative of light intensity. The control signal is applied to the driving amplifier as a feedback signal to adjust the drive signals supplied to the light source in a direction to compensate for deviations from a desired or set level.

The film density is controlled by a second feedback loop which incorporates a film density measuring system to provide a density signal representative of film density. The density signal is also applied as a gain varying and offset signal to control the magnitude of a video image data signal coupled to the driving amplifier for the film writing device. Each of the control system feedback loops are synchronized to selected cycles of operation of the system in order to avoid mutual interference. In an alternate embodiment, the density control is incorporated in the intensity control loop.

DETAILED DESCRIPTION

Referring now to FIG. 1, there is shown a simplified block diagram of an electronic image processing system including a film processing system incorporating a control system in accordance with the present invention. Although the system will be described in conjunction with a preferred embodiment for the control of images on x-ray film, it will be appreciated that the invention may be applicable to other film processing systems. The overall system function is to convert image data supplied to the system at point 10 into viewable images on either positive or negative x-ray film at point 12. In effecting this result, it is necessary that the data converted to an image on x-ray film accurately represent the image data supplied at point 10. It is also important that the image represented on the x-ray film be of a high quality to enable accurate diagnosis of any medical problem appearing on the film. In achieving this last function, the conversion system must be capable of maintaining uniform film density and yet provide for a minimum amount of setup and adjustment time.

The image data supplied at point 10 may be either in analog or digital form. If the image data is supplied as an analog signal, the block 14 may comprise a variable gain linear or piecewise linear amplifier. In the case of image data supplied in digital form, the block 14 may comprise a digital memory device and associated processing circuitry to enable the image data to act as an address or a pointer to identify particular values stored in memory in what is well known in the art as a look-up table. The block 14 may appropriately be characterized as a transfer device having a predetermined transfer function for converting the input signal $V_{IN}$ to an appropriately corresponding output signal VO.

The output signal developed by the block 14 is connected through an electronic switch 16 to a further block 18. The block 18 represents a second amplifier which also has an adjustable gain and in addition, is capable of having a zero offset which is variable in response to a control signal. As can be seen from the graph of the voltage input to block 18 labelled VO and the voltage output labelled $V_D$, the amplifier 18 provides an additional gain and offset for the $V_O$ signal.

The $V_D$ signal produced by the block 18 is coupled to appropriate input terminals of a film writing device which may be a cathode ray tube (CRT) or laser, both of which are well known in the art. As will be appreciated by the shape of the graph shown in the block 20, the CRT or laser characteristic tends to be non-linear with respect to the input drive signal, i.e., the brightness of the generated light beam is a non-linear function of the amplitude of the input drive signal.

Continuing with the block diagram, there is shown a final block 22 which represents the film developing and processing in order to develop the final film image at point 12. As will be appreciated, the output signal indicated as produced by block 20 is in reality the light output of the CRT or laser which is used to expose the x-ray film prior to developing. The effect of any given writing intensity, I, is to produce a film density, D, on the exposed film. The film density versus exposure intensity characteristics shown in the block 22 is the well known characteristic curve of the film and the processing system.

In accordance with the present invention, the control system includes two feedback loops, a first of which monitors the light intensity from the film writing device 20 and provides a feedback signal to the variable gain amplifier 18 in order to maintain the light output of the film writing device at a desired level. The second feedback control loop monitors the density of the exposed and developed x-ray film and provides a feedback signal to the variable gain amplifier block 14 which adjusts the magnitude of the image data signal supplied to the block 18 in order to drive the film density in a direction to correct for any deviations from a desired density. As will be appreciated, there is provided a calibration mode in which the initial values of light intensity output from the film writing device may be established followed by a subsequent step of providing a reference data signal which allows the film density to be adjusted to a desired value. In the calibration of the film writing device 20, the switch 16 is placed in a position such that a voltage reference signal $V_R'$ is applied as an input signal to the amplifier 18. Obviously, the use of the $V_R'$ signal is to assure that a known reference is applied for calibration purposes. A signal $I_R$, which is summed in summing block 24 with a feedback signal representative of write intensity or light output of the film writing device 20, is simply an adjustment signal which can be varied in order to adjust the light output to a desired level. Similarly, film density is established by providing a known reference signal $V_R$ as an input signal to the block 14 while monitoring the density of a film produced at point 12. The feedback loop provides signals indicative of film density which are then summed in summing block 26 with a variable signal $D_R$ which can be adjusted to obtain the desired film density at point 12.

It will be apparent that the closed loop control of film density requires that the film first be exposed with a known gray scale of write intensities and thereafter developed. Subsequently, the densities produced on the film in response to the gray scale exposure must be read to determine whether the write intensities must be adjusted such that the desired film densities are achieved. In order to accomplish these functions, it is necessary that the write intensity output of the CRT or laser device 20 be adjusted to provide an initial known light intensity. Once the film has been exposed and then developed, it can be returned to the writing point in front of the device 20 and the calibrated light output of the writing device 20 can be used to read the actual film density. One form of a reading process is illustrated in FIG. 2. As is shown in the regulated light beam from the writing device 20 is first passed through a calibrated sensitometric block 28 of a type well known in the art. The sensitometric block 28 is mounted adjacent the film writing device 20 in a position abutting the point at which film is inserted to be exposed to the light from the film writing device 20. In the calibration mode the film is placed in position so that the light beam passes through both the sensitometric block 28 and the film 30. The film 30 also includes an exposed sensitometric strip 32 normally positioned along an unused edge of the film. The sensitometric strip is created by the calibration drive signals applied to the film writing device 20 during the calibration cycle. Creation of a sensitometric strip on an unused edge of x-ray film is well known in the art and will not be described in further detail. During the calibration process of the present invention, the regulated light beam from the writing device 20 is scanned in a vertical direction along the edge of the film strip 30 first passing through each step of the sensitometric block 28 and then through each of the gray scale blocks on the exposed sensitometric strip 32. A photodetector 34 located behind the film strip 30 senses the light from the film writing device 20 which passes through the sensitometric block 28 and sensitometric strip 32 and provides output signals proportional to the magnitude of the light impinging on it. The photodetector 34 preferably comprises a single photodector which scans in synchronism with the regulated light beam from the film writing device 20 so as to receive the light beam as it scans down the edge of the film 30. The output signals developed by the photodetector 34 are proportional to the amount of light passing through each section of the sensitometric block 28 and sensitometric strip 32. Since the sensitometric block 28 is a highly calibrated block, the initial portion of the scan is be used to calibrate the photodetector 34. As the light beam thereafter passes through the sensitometric strip 32, the photodetector 34 will provide output signals representative of the density of the image on the film 30. It should be noted that the image forming the exposed sensitometric strip 32 is created by a step voltage $V_R$ applied to the first amplifier 14 of FIG. 1. The use of a step voltage $V_R$ to produce the sensitometric strip 32 is well known in art. Thus, it will be seen that by using the calibrated light output from the film writing device 20, film density can be controlled by periodically creating a sensitometric strip 32 on an edge of a film 30 and inserting the developed film in front of the writing device to allow the photodetectors 34 to compensate the amplifier 14 for any deviations in film density from the desired value. Although the preferred method of calibration of film density is through use of the regulated light beam from the film writing device 20, it will be appreciated that an external calibrated light beam could be used for reading the film densities.

By performing the calibration sequence described above, it will be appreciated that the data supplied to the transfer device 14 can be used to establish a table of film density as a function of the reference voltage $V_R$. In the case of a look-up table, i.e., a digital memory system for processing digital image data, the transfer function will be modified to provide an output voltage for any given input voltage command necessary to produce the desired film densities. In the look-up table format, the system has a greater capability of compensating for non-linear variations in the overall image conversion process. The look-up table can be constructed to have as many reference density settings as there are reference input voltage levels. By so doing, film gamma correction and/or corrections for the non-linearities of the film writing device 20 can be accommodated. However, the use of image data in an analog form provides a much simpler approach since the transfer device 14 may comprise a linear operational amplifier circuit with variable offset and variable gain. The gain and offset can then be adjusted so that the minimum and maximum film density signals produce the desired result and the other signals falling between the minimum and maximum levels would then produce an output signal varying linearly or piecewise linearly between the minimum and maximum values.

In FIG. 3, there is shown in more detail the calibration and control loops for regulating the writing intensity of writing device 20. Before beginning the detailed description, it might be noted that the image data supplied at terminal 10 is in the form of a video signal having a typical television format. In particular, the image data is of a type which can be displayed by application to a typical television video monitor. Referring briefly to Figure 6, there is shown a typical video signal having synchronizing (sync) pulses, back porch reference, video black level reference, and video signal. The upper wave form differs from the lower waveform only in the amplitude of the video signal. Since the illustrative signals are used for calibration, the black cal signal is of smaller amplitude than the white cal signal. As can be seen in FIG. 3, the write intensity feedback loop actually comprises two separate loops, one for detecting the brightest output of the writing device 20 and one for detecting the minimum brightness of the writing device 20. For purposes of this description, it will be assumed that the writing device 20 comprises a CRT. As will be understood, the calibration of the output of the writing device 20 can be done on a periodic basis between film exposures. In order to achieve this function, the image data is coupled into a sync pulse separator 36 which detects the synchronizing pulses contained in the image data signal and provides appropriate timing signals to various sections of the calibration and feedback control loops to insure that the calibration cycles occur at appropriate times. Such synchronizing circuits are well known in the video processing art and will not be described herein.

Referring first to the black level control loop which establishes the intensity of the minimum light output of the writing device 20, there is provided a photosensor 38 positioned adjacent the CRT 20 which provides an output signal to a black sample gate 40. The output signal from the photodetector 38 is proportional to the light output of the CRT 20. However, during the time that the output of the black sensor 38 is sampled, the system is set to produce a minimum gray scale or minimum light output signal at the point adjacent the photodetector 38. For example, the detector 38 typically samples only a single scan line on the face of a CRT at any one instant. Consequently, the gate 40 need only synchronize sampling to a time at which a scan line appears in front of detector 38. The black sample gate 40 is an electronic sampling gate of a type well known in the art and may comprise for example, a gated digital register or an FET switch connected to supply the sampled signal to a storage capacitor. The signal sampled by the black sample gate 40 is applied to a comparator 42 in which it is compared to a black reference signal established by a black reference potentiometer 44. By adjusting the potentiometer 44, the black level or minimum gray scale value of the CRT 20 can be adjusted. The comparator 42 produces an error signal which is applied to a black sample storage circuit 46, which circuit 46 may include a capacitor storage circuit having sufficient capability to hold a particular voltage level signal at a substantially constant value between calibration times. The circuit 46 acts as a proportional plus integral circuit whose output value is incremented or decremented by the signal from comparator 42 in order to generate an appropriate black level control signal. It will be noted that both the black sample gate 40 and the black sample store circuit 46 are operated by a gating signal supplied by an auto-density control circuit 48. The control circuit 48 is in turn provided with a synchronizing signal from the sync separator 36. The control circuit 48 provides the appropriate reference signal $V_R'$ for driving the CRT 20 during the calibrating cycle and also provides the timing signals to allow the black sample gate 40 and black sample store circuit 46 to sample the signal from the photodetector 38 at the appropriate time. The control circuit 48 also supplies the signals for the white sample control loop which controls the maximum write intensity of the writing device 20.

Continuing with the black level control loop, the black sample signal stored in circuit 46 si coupled through an amplifier 50 to a clamp circuit 52. The clamp circuit 52 is driven also by the sync separator 36 which provides a control signal to the black control amplifier 54 at a predetermined time. More particularly, the clamp 52 assures that the black level for the video image data is set only when the minimum black video signal is present. The adjustment of amplifiers for driving cathode ray tubes and in particular the setting of black levels is well known in the television art and will not be described herein.

The setting of the maximum intensity level of light output of the writing device 20 is very similar to the setting of the black level. A white sensor 56 is positioned adjacent the face of the CRT 20 and provides an output signal to a white sample gate 58 which is clocked by the control circuit 48 to sample the output (maximum white level) of the phototransistor white sensor 56 at the appropriate time. The sampled output of the white sensor 56 is compared with a white reference signal in a comparator 60. The resulting signal from comparator 60 is coupled to a white sample store circuit 62 which is also gated by the control circuit 48 at appropriate times. An output signal developed by the white sample store circuit 62 is coupled through an amplifier 64 to an automatic contrast control circuit 66. The auto contrast control circuit 66 may be of the type typically used in television receivers. In essence, the auto contrast control 66 is a variable gain amplifier which adjusts the amplitude of the image data applied to it in a manner to compensate for any deviations from the desired maximum intensity at the CRT 20. The video amplifier 68 couples the video and calibration signals to the CRT and is similarly a standard video amplifier of a type well known in the art.

Although the black level, actually the minimum desired gray scale, is set first, it will be appreciated that the setting or adjusting procedure must be repeated after the white level is set since the white adjustment controls the gain of the amplifier 66 which will vary the amplitude of the entire video signal including that portion corresponding to video black which is used to clamp the black level. Accordingly, the control circuit 48 is adapted to reiterate the black level set procedure after the white level is set.

It will be noted that a sensitometer generator 70 produces the aforementioned calibrated sensitometer output signal utilized to generate the sensitometric strip 32 on the film 30 as shown in FIG. 2. The sensitometer generator 70 is also provided with a synchronizing signal from the sync separator 36. A density calibration circuit 72 which is manually activated by a density calibration input signal from an operator, is utilized to activate a switch 74 during the density calibration mode. The density calibration circuit 72 provides a signal to cause a switch 74 to switch from the video image terminal 10 to a sensitometer generator terminal 76. During the density calibration cycle, the auto density circuit 48 opens the switch 16 to disconnect the image data to allow the density calibration circuit 72 to supply a known reference signal to the write control system. The signal from density calibration circuit 72 is supplied through a summing junction 78 to an input terminal of the auto contrast control circuit 66. The auto density circuit 48 also has control of the electronic switch 80 to move it to bypass the auto contrast control circuit 66 during the black level restoration process. As will be appreciated, the auto contrast control would attempt to compensate for low light levels if the switch 80 were left connected to the contrast control circuit 66 during initial calibration. During the reiterated black level calibration steps, the switch 80 is left in the position such that the video signal passes through the amplifier 66 so that the black level clamp voltage includes the gain of amplifier 66 to compensate for the gain shift of actual gray level above the back porch level.

Although the photodetectors or sensors 38 and 56 have been illustrated as two separate sensors, it will be appreciated that a single sensor could be utilized by sequential reading of black and white levels. In the system in which both sensors are used, the black and white sensors can be read in parallel by appropriately controlling the drive signals to the CRT so that white or maximimum brightness is attained adjacent the white level sensor and black or minimum brightness is attained adjacent the black or gray level sensor. In either case, the auto density circuit 48 provides a synchronizing signal to the sample gates 40 and 58 to latch the data obtained from the black and white sensors. The sampled black level signal from gate 40 is compared in the comparator 42 with the reference signal on a repetitive cycle until the desired black level is achieved. The white sample circuit 62 is then operated to adjust the white level signal until the white level reaches a desired magnitude. The black level can then be re-checked and the process iterated until both white and black levels are at the desired level or until the error signals produced by the comparators 42 and 60 are sufficiently small.

Once the write intensity of the film writing device 20 has been set to a calibrated level, the film density loop can be activated to permit the gain of the first transfer device 14 to be adjusted to a level to compensate for any deviations from desired film density. It should be noted that calibration of the write intensity output of the film writing device 20 does not require that film be exposed. A shutter can be provided and kept closed during the write intensity calibration process.

FIG. 4 is another embodiment of the present invention in which the film density control loop is incorporated in the write intensity control loop. Specifically, the black sample store circuit 46 and the white sample store circuit 62 are each replaced by a density control circuit 82 and 84, respectively. The circuits 82 and 84 function in the same manner as the circuits 46 and 62 but additionally include a direct current (DC) level shift capability which is responsive to a density control signal for shifting the DC level of their respective output signals. The black level control loop is responsive to a minimium density control signal while the white level control loop is responsive to a maximum density control signal.

In order to clarify the operation of the system of FIG. 4, reference is now made to FIG. 5 in which there is shown a block diagram of apparatus for generating the minimum and maximum density control signals. The block 86 labeled auto-density calibration controller is a part of the block 48 of the system block diagram. The block 86 is described separately here inasmuch as the prior description has already disclosed the various other functions which signals from the auto-density control circuit 48 perform. It will be noted that control circuit 48 is labeled as an auto-brightness controller in FIG. 4 even though it is essentially the same circuit 48 as described with respect to FIG. 3, the auto-brightness label is applied here since the circuit functions in conjunction with the brightness or intensity control loop for the CRT 20. As shown in FIG. 5, the auto-density calibration command which is generally a manual operation command initiates the auto-density calibration cycle. The manual initiation is required since the calibration cycle requires that an exposed calibration cassette such as that illustrated at 88 or an exposed portion of a film be placed in a position to be analyzed by the photodetector associated with the system. The calibration cassette 88 is an alternate embodiment of the previously described calibration film strip using the sensitomer strips and calibrated sensitometer blocks. In the calibration cassette, two reference film densities 90 and 92, are provided to enable the photo detector 94 to become calibrated to particular maximum density and minimum density levels represented by the two reference levels. A photo detector positioner 96 which may be a motor driven positioner is mechanically coupled to the photo detector 94 and arranged to position it at locations wherein light passing through the maximum and minimum film density reference blocks 90 and 92 can be sampled by the photo detector 94. Actuation of the detector positioner 96 is by a signal coupled from the auto density calibration controller 86. Operation of the detector positioner may be either in a timed sequence or there may be provided feedback signals from the detector 96 to identify the particular location of the detector as it moves the photo detector 94 by the reference film strips. The photo detector also is driven past the sensitometer strip 98 which is the same type of sensitometer strip described previously with regard to FIG. 2. More particularly, the sensitometer strip is exposed along an edge of an X-ray film or calibration cassette by light emitted from the CRT or laser device 20. Thus, as the photo detector passes along the sensitometer strip 98, it can pick out those particular blocks within that strip which correspond to the desired maximum and minimum density values represented by the blocks 90 and 92. It will be appreciated of course, that the photo detector does not actually do the comparison but does provide the signals which are coupled through an amplifier 100 to the circuitry which actually compares the maximum and minimum density values to the values developed along the edge of the film in the sensitometer strip 98.

The signals developed by the amplifier 100 are coupled through an analog to digital converter 102 to a reference register 104 and a sample register 106. The values of the maximum and minimum density strips 90 and 92 are stored in the reference register 104 while the sample register 106 is used to store the values in digital form of each of the scaled density areas in the sensitometer strip 98. Clock signals provided from the auto density calibration controller 86 are used to clock the reference register 104 and sample register 106 to both allow the sample values to be stored and also to further clock the values from the registers into a digital comparator 108.

The results of the digital comparison in comparator 108 are coupled through AND gates 110 and 112 to respective minimum density register 114 and maximum density register 116. The AND gates 110 and 112 are gated or selected by signals supplied from the auto density calibration controller 86. Obviously, if the comparator 108 is searching for a minimum density match, then the results of that comparison should be stored in the minimum register 114. Likewise, a maximum density match would be stored in the maximum density register 116. Thus, the controller 86 provides select signals to each of the AND circuits 110 and 112 in order to gate the appropriate AND circuits to enable the proper register 114 or 116 to receive the step code information from controller 86. The minimum density register 114 has its output connected to a look-up table 118 which is used to convert the density step code to an appropriate gain control or DC offset value, in this instance a minimum density control value, which is supplied to the black level density control block 82 in FIG. 4. Similarly, the density step code from register 116 is also applied to a look-up table 120 in which it is converted to a maximum density control signal supplied to the density control block 84 in FIG. 4.

It will be apparent that the various control signals from the auto density calibration controller are necessary in order to synchronize the operation of the photo detector 94 and to appropriately compare each of the gray scale values sequentially in the sensitometer stripe 98 to the appropriate maximum or minimum reference value 90 or 92 in order to determine the appropriate density control value to be applied to the circuit 82 and 84.

The automatic brightness control of the present invention may be initiated automatically or by command from an X-ray machine operator. The brightness calibration sequence corrects for any change in brightness and/or offsets which are due to component changes with time and temperature. When the automatic brightness command is received, the controller first opens the switch 16 to isolate the video input signal from the control system. The shutter between the CRT and the X-ray film is normally closed at this point to prevent exposing the film during the brightness calibration sequence. The auto brightness circuit then changes the position of switch 80 and begins the black level set procedure by generating a black sample signal at the same time that the calibration pulses are supplied to the black control circuit 54. Changing the position of the switch 80 by-passes the automatic contrast control or variable gain amplifier 66 which would defeat the initial setting of the black level control. After the black level control loop has provided a satisfactory minimum black loop error out of the comparator 42, the switch 80 is released back to its normal position and the white calibration signal and white samples pulses are generated to initiate the white level calibration sequence. When the white level loop error is determined to be at a desirable minimum level, the controller goes back to repeat the black loop setting with the auto contrast control 66 in the system. As was mentioned previously, this is necessary since the gain of the auto contrast control 66 will affect the level of the minimum video or black level signal. The system will reiterate the black and white level control loop calibration cycles until the loop error in each loop is within a minimum range. In the embodiment shown in FIG. 4, the maximum density and minimum density control signals are set at zero during the brightness control calibration cycles since it is necessary to isolate the density control offset values during the brightness calibration cycles.

In order to automatically calibrate the system for film density variations, it is necessary to process a film using appropriate calibration signals as described above to generate the sensitometry strips necessary to allow the system to match desired reference values with actual measured values. In the preferred embodiment illustrated in FIG. 5, the film is processed and developed and then placed in the special calibration cassette holder 88. The calibration cassette 88 with the test film is loaded in the system and an auto density calibration command is activated to begin the auto density calibration process. The auto density controller 86 illuminates the test film with flat white light from the CRT. The detector 94 is positioned to read the minimum density reference shown in the film strip 92 and the value of that reference is then temporarily stored in the reference register 104. The detector is then moved down to view the exposed film sample strip 98 to search for an equivalent density level on the test film. When the comparator 108 detects a match, the controller outputs a step code which is stored in the register 114. The minimum density step code is a code value which is available in the auto density calibration controller 86 as it positions the photo sensor 97 in search of the step on film strip 98 which matches the reference density value. More particularly, the film density strip 98 is generated by a sequence of step voltage values which are incremented across the CRT during the calibration cycle. These values expose the film creating a sequence of steps varying from below the minimum reference density value to above the maximum reference density value. The controlled sequences the step values in the order they appear on the film strip. Accordingly, when the comparator detects a match between a particular step value or film density value and the reference value, the controller then picks from its memory the particular voltage or density value which created that particular density value on the film. That value is then stored in the minimum density register. Similarly, once the minimum density value has been found, the photo detector then moves into position to store the value associated with the maximum density reference at strip 90 and then moves down to monitor each of the values in the film strip 98 until a corresponding maximum density value is isolated. When the comparator 108 provides a matched signal to the controller 86, the controller then provides a step code to the maximum density step register corresponding to that particular value of film density. The register then outputs that value to a look-up table which provides the appropriate gain control signal to the white level density control loop.

The sensitometer signal generator 70 generates a conventional stair step signal which is identical to the normal input video in amplitude and set up. This signal is used to expose a piece of film as a periodic verification of the performance of the system. The process of generating the stair step voltage and providing a sensitometer strip are well known in the X-ray film art.

It should now be appreciated that this invention provides a method and apparatus for automatically controlling the processing of electronic images to film images with compensation for variations in the light output of a film writing device and variations in the film and film processing device.

We claim:

1. In an imaging system for generating an image on film from video image data, the system including at least one controllable transfer device for controlling the image data, a method for controlling film density comprising the steps of:

providing a film writing device having a predetermined light intensity output in response to a predetermined input command signal amplitude;

generating an input command signal having an amplitude varying as a function of position of a light beam from the film writing device whereby the light intensity output varies in correspondence with beam position;

exposing a film to the light output from the film writing device;

developing the exposed film;

reading the image density on the film using the light output from the film writing device at the predetermined intensity; and adjusting the controllable transfer device in response to the image intensity read on the film to effect a corresponding adjustment in the image data to correct for deviations in film density from a desired value.

2. The method of claim 1 wherein said step of reading the image density of the film comprises the further steps of:

generating a light beam of uniform intensity from the film writing device;

scanning the generated light beam through a neutral density sensitometric block;

detecting the light beam passing through the sensitometric block with a photodetector;

calibrating the photodetector to produce output signals corresponding to the grey scale values of the sensitometric block based upon the light beam passing therethrough;

scanning the generated light beam through the exposed film; and reading the film density with the calibrated photodetector.

3. The method of claim 2 wherein the output signals developed by the photodetector during the film reading step are applied to the transfer device to modify its transfer characteristic to compensate for film density deviations.

4. The method of claim 1 wherein said step of providing a film writing device having a predetermined light intensity output comprises the substeps of:

driving the film writing device with a signal having a predetermined value through a first controllable gain amplifier;

measuring the light intensity output of the film writing device; and adjusting the gain of the first amplifier to force the predetermined light intensity output.

5. The method of claim 4 and including the further steps of:

measuring the minimum light intensity output of the film writing device; and setting the amplitude of bias voltage applied to the device such that a desired minimum light intensity is achieved.

6. A control system for providing substantially constant film density of negative and positive images on film in a system for developing film images from electronic image data, the control system comprising:

a film writing device for providing a controllable light intensity output in response to a write intensity input signal;

means for exposing the film to the light output of said device;

means for developing the exposed film;

means for determining the film density of the developed film and for generating a signal representative of the film density; and means responsive to said film density representative signal for varying the write intensity input signal in a manner to adjust the light intensity output to compensate for deviations in film density from a desired level.

7. The control system of claim 6 wherein said film writing device comprises:

a controllable light source;

a variable gain amplifier having an input terminal for receiving the write intensity input signal and an output terminal for providing a drive signal to said light source, and further including a first control terminal for receiving a gain control signal;

means for monitoring the light intensity output of said light source, said monitoring means providing a signal representative of the intensity of light output from said light source; and means coupling said light intensity representative signal to said amplifier control terminal for selectively varying the gain of said amplifier in a direction to provide a predetermined light intensity output in response to a predetermined magnitude of input signal.

8. The control system of claim 6 wherein said means responsive to said film density representative signal comprises a controllable transfer device having a data input signal terminal, a data output terminal and a control terminal, said transfer device operating on the image data applied to said input terminal to provide an output signal at said data output terminal having a determinable relationship to the image data, said determinable relationship being variable in response to said film density representative signal applied to said control terminal.

9. The control system of claim 8 wherein said transfer device comprises a variable gain analog amplifier.

10. The control system of claim 8 wherein said transfer device comprises a digital memory device having a plurality of light intensity values stored in a look-up table format, the image data being formatted as an address to effect readout of selected stored values in response to the corresponding image data.

11. The control system of claim 7 wherein said amplifier includes a second control terminal, said amplifier being arranged to have a variable zero offset in response to a signal applied to said second control terminal, said control system including:
   means for determining minimum light intensity output of said film writing device and for producing a signal representative thereof; and
   means for coupling said minimum intensity signal to said second control terminal whereby said amplifier offset is adjusted to provide a desired minimum light intensity.

12. The control system of claim 11 wherein said amplifier comprises:
   a first variable gain linear amplifier providing an output signal proportional to the write intensity input signal, the proportional relationship being variable in response to said light intensity representative signal; and
   a second linear amplifier having a predetermined fixed gain and an adjustable minimum output signal, said second amplifier including said second control terminal for effecting adjustment of said minimum output signal.

13. The control system of claim 12 wherein said means for monitoring the light intensity output comprises a light sensing device connected in a light path of said light source, said light sensing device providing an output signal proportional to the light output of said light source adjacent said light sensing device.

14. The control system of claim 13 wherein said means coupling said light intensity representative signal to said amplifier control terminal comprises:
   means for selectively sampling the output signal from said light sensing device;
   means for comparing said sampled output signal to a predetermined reference signal and for providing a summation signal representative of the difference therebetween;
   means for storing said summation signal; and
   means for applying said stored summation signal to said first control terminal.

15. The control system of claim 11 wherein said means for determining minimum light intensity output comprises a light sensing device connected in a light path of said light source, said light sensing device providing an output signal proportional to the light output of said light source adjacent said light sensing device.

16. The control system of claim 15 wherein said means for coupling said minimum intensity signal comprises:
   means for selectively sampling the output signal from said light sensing device;
   means for comparing said sampled signal to a predetermined reference signal and for providing a summation signal representative of the difference therebetween;
   means for storing said summation signal; and
   means for applying said stored summation signal to said second control terminal.

17. The control system of claim 16 wherein said means for applying said stored summation signal comprises a clamp circuit synchronized to a standard video wave form such that said minimum intensity level is set only when said video signal is at corresponding minimum level.

18. The control system of claim 7 wherein said coupling means includes said film density responsive means.

19. The control system of claim 18 wherein said film density responsive means comprises a variable offset proportional plus integral signal transfer device having a signal input terminal for receiving a signal representative of the difference between an intensity reference signal and said light intensity representative signal and further including a control terminal for receiving said film density representative signal for varying said difference signal in proportion thereto.

20. The control system of claim 7 wherein said monitoring means includes a first photodetecting sensor for monitoring light output of said light source at a first minimum level and a second photodetecting sensor for monitoring light output of said light source at a second maximum level.

21. The control system of claim 7 wherein said coupling means includes a first control loop for adjusting the minimum light intensity output and a second control loop for adjusting the maximum light intensity output.

* * * * *